E. G. TAYLOR.
DISHPAN.
APPLICATION FILED SEPT. 6, 1921.
1,423,548.
Patented July 25, 1922.
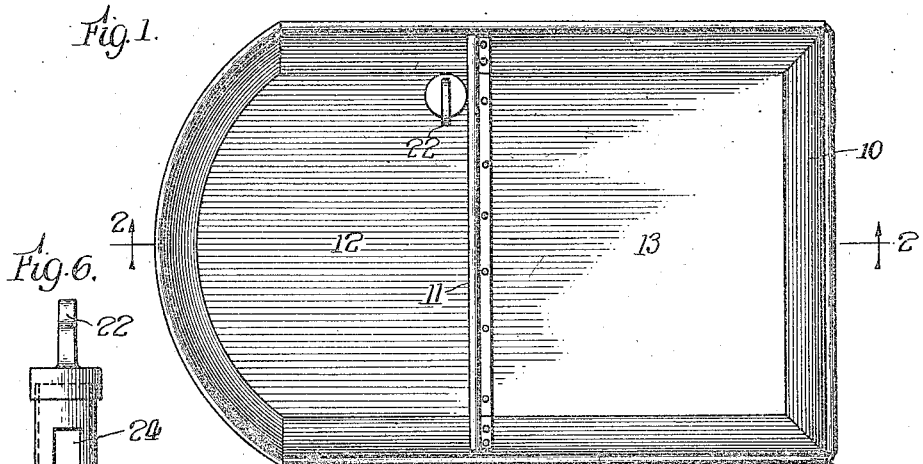
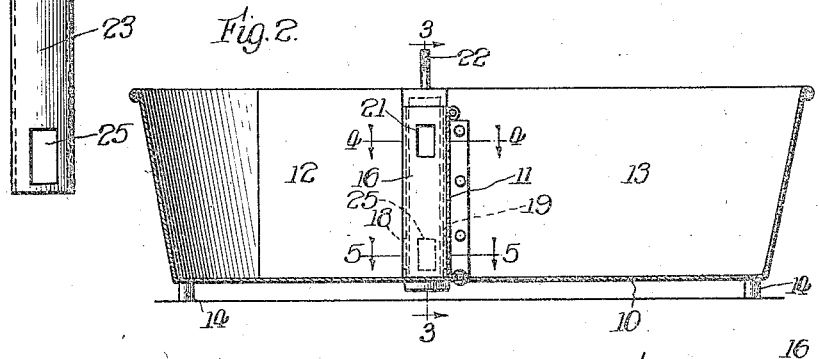
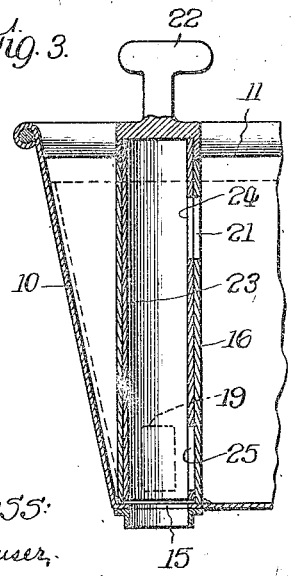
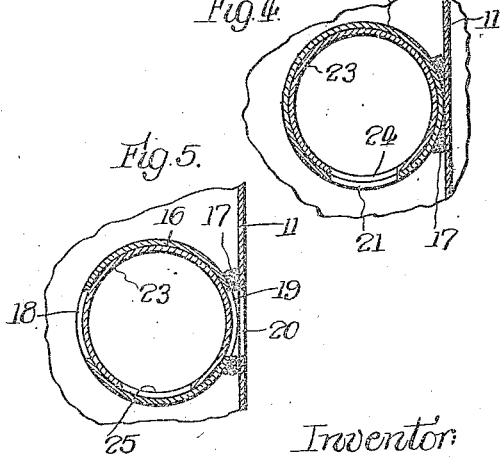
Witness:
A. J. Sauser.
Inventor
Edward Gordon Taylor,
By Samuel N. Pond
Atty.

UNITED STATES PATENT OFFICE.

EDWARD GORDON TAYLOR, OF MADISON, WISCONSIN.

DISHPAN.

1,423,548.  Specification of Letters Patent.  Patented July 25, 1922.

Application filed September 6, 1921. Serial No. 498,762.

*To all whom it may concern:*

Be it known that I, EDWARD GORDON TAYLOR, a citizen of the United States, residing at Madison, in the county of Dane and State of Wisconsin, have invented certain new and useful Improvements in Dishpans, of which the following is a specification.

This invention relates to improvements in dish washing devices, and has reference more particularly to a novel construction of dish pan. In its preferred form the dish pan of my invention follows the known type of dish pan which includes washing and rinsing compartments separated by a substantially central transverse partition, the dishes being washed and cleansed in soapy water in the washing compartment and then transferred to the rinsing compartment wherein they are scalded and dried by being immersed in a body of pure hot water.

The general object of the invention is to provide an improved and simplified structure of dish pan of the double compartment type which may fit within an ordinary kitchen sink and may easily be shifted endwise to bring the washing compartment beneath both the hot and cold water faucets and bring the rinsing compartment beneath the hot water faucet. Another object is to provide an improved valve mechanism through which, by the use of a single valve, both compartments may be drained. A further object is to provide an improved overflow valve communicating with the washing compartment, by which the grease and other scum lighter than water may be drained off through the overflow valve either prior to or during the washing of the dishes. A further object is to provide a construction whereby the excess of hot water in the rinsing compartment may overflow into the washing compartment.

Still other objects and advantages of the invention will be apparent to persons familiar with kitchen utensils of this character from the following detailed description, taken in connection with the accompanying drawing wherein I have illustrated a practical and preferred embodiment of the invention, and in which—

Fig. 1 is a top plan view of my improved dish pan;

Fig. 2 is a longitudinal vertical section taken on the line 2—2 of Fig. 1;

Fig. 3 is an enlarged fragmentary vertical section taken on the line 3—3 of Fig. 2;

Figs. 4 and 5 are enlarged detail horizontal sections taken on the lines 4—4 and 5—5, respectively, of Fig. 2; and Fig. 6 is a detail elevation of the valve.

Referring to the drawing, 10 designates as an entirety an oblong pan of sheet metal preferably formed with flaring side walls, as shown; and 11 designates a substantially central transverse partition wall by which the pan is divided into a washing compartment 12 and a rinsing compartment 13. Preferably the bottom of the pan is provided with four short legs 14 at the corners by which the bottom of the pan is supported a slight distance above the bottom of the sink.

In the washing compartment 12, and preferably at the right hand rear corner thereof, there is formed in the bottom of the pan a drain hole 15 (Fig. 3); and soldered or otherwise secured to the bottom around the hole 15 is an upstanding tubular valve casing 16, the upper end of which reaches nearly to the level of the top edge of the pan. Preferably, and as herein shown, this valve casing 16 is disposed tangent to the partition wall 11 and is soldered to the latter, as indicated at 17 in Figs. 4 and 5. Said valve casing 16 is formed at or near its lower end with a pair of diametrically opposed drain ports 18 and 19, the former of which communicates directly with the washing compartment 12, while the latter communicates with the rinsing compartment 13 through a registering port 20 (Fig. 5) formed in the partition wall 11. At a point slightly below the upper end of the valve casing, the latter is formed with a similar overflow port 21 which is located circumferentially midway between the drain ports 18 and 19. Fitting within the valve casing 16, with sufficient snugness to afford practically water-tight joints at the drain ports 18 and 19, and yet capable of manual turning movement therein by means of a handle 22 mounted thereon, is a tubular valve 23 shown in isolated detail in Fig. 6. This valve is formed with an upper overflow port 24 adapted to be moved into and out of register with the overflow port 21 of the casing, and, in longitudinal alinement with the port 24 is a drain port 25 that is movable into and out of register with either of the drain ports 18 and 19 of the casing. It will be observed by reference to Figs. 2, 4 and 5, that when the overflow ports 21 and 24 are in register, both of the drain ports 18 and 19 are closed; and when either of the drain ports 18 and 19 is open, the overflow port 21 is closed.

In the use of my improved dish pan, the valve is first set to the position indicated in the drawings, both drain ports being closed and the overflow port being open. The soiled dishes are then placed into the washing compartment 12 and flooded with hot water and soap. As the level of the water rises, the grease, scum and other matter lighter than the water floats on top of the latter, and as soon as the level reaches the lower edge of the overflow port 21, this floating matter flows off through the overflow port and is thus in large measure gotten rid of before the actual washing of the dishes begins. The washing may then proceed with the overflow port left open and gradual additions of hot water to carry off the grease and scum during the washing operation or the valve handle may be swung to the right, viewing Fig. 1, closing the overflow port 21 without opening the drain port 18, and allowing the washing compartment to be completely filled with water and suds.

As the dishes are washed they are transferred to and stacked up in the rinsing compartment 13, and when the washing is completed, the valve handle is turned to the left, viewing Fig. 1 until the drain ports 18 and 25 are brought into register, and the soiled water runs off into the sink and through the usual drain of the latter. The washed dishes in the compartment 13 are then flooded with pure scalding water, whereupon the valve is again turned to bring the drain ports 25 and 19 into register, by which the rinsing or scalding water is drained off, leaving the dishes practically dry from their own heat.

An alternative method to which the improved pan readily lends itself, consists in maintaining the overflow port constantly open and the drain port of the rinsing compartment closed during the operation; filling the rinsing compartment with scalding water and placing the washed dishes successively therein.

By making the upper edge of the partition 11 slightly lower than the opposite side walls of the pan, as clearly shown in Fig. 2, a useful result is secured under both of the described methods of rinsing, since, under the first method, any excess of scalding water poured over the dishes in the rinsing compartment overflows into the washing compartment and partially rinses the latter; while, under the second method, the hot water displaced by the dishes as they are placed in the rinsing compartment overflows into the washing compartment and brings up the volume and temperature of the water in the latter.

I am aware that twin compartment dish pans provided with separate valve controlled drains are broadly old and known; but my present invention simplifies the construction of such pans by employing a single valve and, furthermore, a valve of which the movable part within the pan itself is entirely shielded or guarded from possible contact with the dishes, so that the latter cannot be broken or chipped by movement of the valve. The feature of a valve controlled overflow, enabling the user to preliminarily rid the washing water of grease and other matter lighter than water, and then completely fill the washing compartment with water and suds is of considerable value and utility, and may obviously be employed to advantage in a single compartment pan.

While I have shown and described an embodiment of the invention which has been found to satisfactorily effectuate the stated purposes and objects, it will be evident that the specific details of structure and arrangement may be considerably varied and modified without altering the essential character of the invention or sacrificing any of the advantages inherent therein. Hence, I reserve such variations as fall within the spirit and purview of the appended claims.

I claim:

1. As a new article of manufacture, a dish pan having a transverse partition dividing the same into washing and rinsing compartments, a tubular valve casing mounted in said pan and formed with separate drain ports communicating with said washing and rinsing compartments respectively, and a hollow valve rotatable in said casing and opening at its lower end through the bottom of said pan, said valve having a drain port adapted to register with either drain port of said casing.

2. As a new article of manufacture, a dish pan having a transverse partition dividing the same into washing and rinsing compartments, an upstanding tubular valve casing mounted on the bottom of said pan contiguous to said partition and formed at its lower end with separate drain ports communicating with said washing and rinsing compartments respectively, and a hollow valve rotatable in said casing and opening at its lower end through the bottom of said pan, said valve having a drain port adapted to register with either drain port of said casing.

3. As a new article of manufacture, an oblong dish pan having a substantially central transverse partition dividing the same into washing and rinsing compartments, an upstanding tubular valve casing mounted on the bottom of said pan in one corner of the washing compartment and contiguous to said partition, said valve casing having at its lower end a pair of drain ports at diametrically opposite points thereof communicating with said washing and rinsing compartments respectively, and a hollow valve rotatable in said casing and opening at its lower end through the bottom of said pan, said valve having a drain port movable into and out of register with either drain port of said casing.

4. As a new article of manufacture, a dish pan having a drain hole in its bottom wall, an upstanding tubular valve casing mounted on said bottom and surrounding said drain hole and formed with a drain port at its lower end and an overflow port adjacent to its upper end, and a hollow valve rotatable in said casing, said valve having a drain port movable into and out of register with the drain port of said casing, and an overflow port movable into and out of register with the overflow port of said casing; the drain and overflow ports in one of said parts being laterally offset, whereby to independently control the drain and overflow.

5. As a new article of manufacture, a dish pan having a substantially central transverse partition dividing the same into washing and rinsing compartments, an upstanding tubular valve casing mounted on the bottom of said pan contiguous with said partition, said valve casing having at its lower end a pair of drain ports at diametrically opposite points thereof communicating with said washing and rinsing compartments respectively, and an overflow port adjacent to its upper end substantially midway between said drain ports and communicating with said washing compartment, and a hollow valve rotatable in said casing and opening at its lower end through the bottom of said pan, said valve having a drain port movable into and out of register with either drain port of said casing, and an overflow port in longitudinal alinement with said drain port and movable into and out of register with the overflow port of said casing.

6. As a new article of manufacture, a dish pan having a drain hole in its bottom, an upstanding tubular valve casing mounted on said bottom and surrounding said drain hole and formed with a drain port at its lower end and an overflow port at a point below the upper edges of the side walls of said pan and laterally offset from said drain port, and a hollow valve rotatable in said casing and formed with upper and lower drain ports adapted to register, in different positions of said valve, with said casing overflow and drain ports respectively.

EDWARD GORDON TAYLOR.